United States Patent [19]

Gademann et al.

[11] Patent Number: 4,700,973
[45] Date of Patent: Oct. 20, 1987

[54] TRIGGER SYSTEM FOR A VEHICULAR PASSENGER RESTRAINT SYSTEM

[75] Inventors: Lothar Gademann, Rottenburg; Bernhard Mattes, Sachsenheim; Eberhard Mausner, Ludwigsburg; Wadym Suchowerskyj, Schwieberdingen; Norbert Rittmannsberger, Stuttgart, all of Fed. Rep. of Germany

[73] Assignee: Robert Bosch GmbH, Stuttgart, Fed. Rep. of Germany

[21] Appl. No.: 873,490

[22] Filed: Jun. 12, 1986

Related U.S. Application Data

[63] Continuation of Ser. No. 632,379, Jul. 19, 1984, abandoned.

[30] Foreign Application Priority Data

Aug. 4, 1983 [DE] Fed. Rep. of Germany ....... 3328114

[51] Int. Cl.[4] .................... B60R 21/32; G01P 15/09
[52] U.S. Cl. .................... 280/735; 180/282; 73/431; 73/493; 73/516 R
[58] Field of Search ............ 73/493, 516 R, 517 R, 73/431; 340/52 H; 280/735, 802; 180/282; 307/121, 105 B

[56] References Cited

U.S. PATENT DOCUMENTS

| | | | |
|---|---|---|---|
| 3,390,286 | 6/1968 | Gradin et al. | 310/319 |
| 3,978,715 | 9/1976 | Farstad | 73/516 R |
| 4,164,263 | 8/1979 | Heintz et al. | 73/517 R |
| 4,333,342 | 6/1982 | Gilden et al. | 73/516 R |

FOREIGN PATENT DOCUMENTS

| | | | |
|---|---|---|---|
| 2813457 | 10/1979 | Fed. Rep. of Germany | 280/735 |
| 52-37333 | 3/1977 | Japan | 280/735 |

OTHER PUBLICATIONS

Article in ATZ "Automobiltechnische Zeitschrift" (Journal for Automotive Technology) 84, vol. 2, 1982, pp. 77–83.

Primary Examiner—John Chapman
Attorney, Agent, or Firm—Frishauf, Holtz, Goodman & Woodward

[57] ABSTRACT

To facilitate assembly and provide for high-level output from a deceleration sensor which provides, inherently, only very low level output, an evaluation circuit, such as an amplifier structure, is connected immediately adjacent the deceleration sensor on a common metal plate, interconnected thereby by bonding wires, the common plate having connecting pins (18) passing therethrough for connection to a standard plug-and-socket connector; the evaluation circuit and the deceleration sensor are enclosed within a common sealed housing, so that both the deceleration sensor (12, 12′) as well as the evaluation circuit (16, 17) are sealed against ambient influences, preferably retained within a high-viscosity fluid, such as insulating oil. All elements can be located on one side of the housing, in which a standard T5 transistor housing is suitable; or the deceleration sensor may be located on the other side of the metal plate (10) from the evaluation circuit, in which case a plastic housing can be used, only the deceleration sensor being secured to the metal plate by a metal housing cap, sealed to the metal plate.

31 Claims, 5 Drawing Figures

TRIGGER SYSTEM FOR A VEHICULAR PASSENGER RESTRAINT SYSTEM

This application is a continuation of application Ser. No. 632,379, filed July 19, 1984, now abandoned.

Reference to related application, assigned to the assignee of the present invention, the disclosure of which is hereby incorporated by reference: U.S. Ser. No. 631,933, filed July 19, 1984, MATTES et al now U.S. Pat. No. 4,614,876.

The present invention relates to passenger restraint systems for automotive vehicles, and more particularly to the construction of a combined deceleration sensor and evaluation circuit therefor.

BACKGROUND

The literature reference referred to above describes a triggering arrangement for a passenger restraint system which, selectively, may be either a seat-and-lapbelt or other belt tensioning device, or, for example, an airbag. The literature describes such a system in which an accelerometer, or, more accurately, a deceleration sensor, senses deceleration of the vehicle of a magnitude representative of a collision or an impending collision, and provides an output signal to an evaluation circuit. The output signal then provides a triggering or firing signal to an electrical firing circuit which, for example by means of an explosive pellet or similar chemical reaction, causes immediate inflation of an airbag, or locking and/or tightening of a belting arrangement. The electrical portion of the system operates practically instantaneously; the chemical portion can operate later, and the separation between electrical operation and other operation is provided since, in case of a collision, electrical power may be interrupted by destruction of the electrical battery in the vehicle, or conductors and wires connected thereto.

The signal levels supplied by the accelerometer, and processed within the evaluation circuit may be very low. It has previously been proposed—see U.S. Pat. No. 4,164,263, Heintz et al (to which German Patent Disclosure Document DE-OS No. 26 55 604 corresponds)—to locate the electrical portion of the evaluation circuit, including, if desired, the accelerometer in a separate restraint housing. This housing must be made specially, and introducing the respective elements therein is an expensive manufacturing and assembly operation, particularly since the accelerometer itself must be secured in a separate accelerometer housing or in a partial housing structure within the overall restraint housing element.

THE INVENTION

It is an object to so construct the triggering system or assembly of the passenger restraint system that it can be easily assembled within a housing which can be tight with respect to ambient changes, such as humidity, air pressure, and further is highly resistant to contamination, to thus provide a hermetically sealed overall structure.

Briefly, at least one deceleration sensing element, and forming part of the deceleration sensing arrangement, since more than one deceleration sensor may be provided, is secured to a metal plate. A support carrier is provided, supporting the evaluation circuit, the support carrier in turn being secured to the metal plate. The evaluation circuit itself includes an integrated electronic circuit component. The metal plate is connected to a housing cap in an airtight structure, either forming a closing plate or being surrounded thereby if the various components within the housing structure are located on two sides of the metal plate. The support carrier, the metal plate, and the housing cap are all secured together into one structural integral unit, the housing cap retaining the metal plate in position. The metal plate may, simultaneously, function as a structural support element, securable to the vehicle for sensing of deceleration, and thus of sufficient strength to withstand deceleration resulting from an impact, while also acting as a cooling plate for the electrical components and as an overall support structure.

The arrangement has the advantage that all the components can be simply and cheaply assembled, while being reliably attached to a plate which is of sufficient strength so that it can be applied to the vehicle and form this potentially life-saving sensing element. The housing structure, for example, may be a hat-shaped device, so that the overall element can be included within a standard transistor housing, for example the "T5" housing. The housing may, however, also surround the metal plate, the terminal elements passing through the metal plate. The metal plate, with the electrical and electronic components thereon, can be manufactured as a subassembly, the metal plate with all the components then being tightly secured in the housing, which is closed by the cover cap. The cover cap and the metal plate define a single, sealed chamber therebetween. The decelaration sensing arrangement as well as the evaluation circuit are thus retained in a single sealed chamber.

In accordance with a preferred feature of the invention, current supply and signal supply terminals are passed through the metal plate, so that all terminal connections can be formed in one manufacturing step during manufacture of the metal plate, and separate termination elements, and their assembly costs can be eliminated. The respective electronic and electrical elements, and the current supply pins or leads themselves, can be connected similarly to the connection of integrated circuits, for example by bonding wires, with standarized bond connections. The externally extending connections, for example, can be in the form of connecting pins, so that the overall structure will fit into a standard multi-terminal electronic socket.

The deceleration sensors, for example, may be piezoelectric strips. Such strips can easily be secured to a metal plate, which is deformed in the region of the acceptance of the strip by providing locating projections or locating bumps, so that the piezo-electric strip can be oriented on the metal plate during assembly. Electrical terminals to the piezo-electric strip then are connected over a ceramic socket or a metal socket for one terminal; the second terminal to the piezoelectric strip can be in the form of a small soldering area or solder plate, which retains a bonding plate connected to a standard bonding wire. The bonding plate and the soldering plate are then connected in well-known manner, the bonding plate, for example, being located on an insulating portion of a ceramic socket. This arrangement substantially simplifies the assembly and results in low manufacturing costs.

DRAWINGS

DETAILED DESCRIPTION

Figure 1:
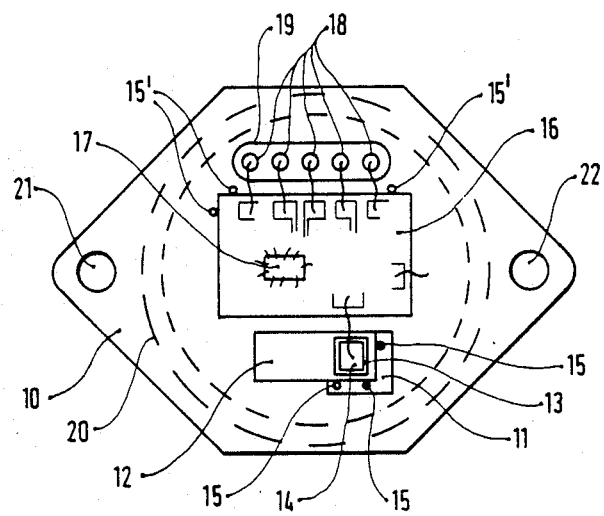
FIG. 1 is a top view of an embodiment of the invention, with a housing cover removed.

A metal plate 10 (FIGS. 1, 2) forms, combined, a structural support and cooling element for various types of electronic components of the sensor. The metal plate 10 also forms a ground or chassis connection, and is adapted to be securely connected to a structural component of a motor vehicle. The metal plate 10 also forms a holding element for a base 11 for a piezoelectric deceleration sensor 12. The base 11 may be deformed from the major surface of the metal plate, and may include, for example, another metal plate or a ceramic plate, soldered or bonded to the top surface of metal plate 10, or integral with the metal plate 10 by a punch depression from below, resulting in a projection at the top side of the metal plate 10. The piezoelectric deceleration sensing element 12 is either soldered or bonded or adhered to the base 11. The deceleration sensor, preferably, is a dual piezoelectric strip, of well known construction extending essentially parallel to the metal plate 10. The base 11 forms one terminal, for example the ground terminal, for one of the electrodes of the deceleration sensor 12. The other electrode of the decleration sensor 12 has a solder plate 13 secured thereto, over which a bonding plate 14 is attached, for example by soldering or electrically conductive bonding. For precise positioning of the piezoelectric strip, at least three projecting bumps 15 are formed on the base 11. These bumps may be formed directly as projections from the base structure 11 during manufacture of the base structure 11, for example in a single punching operation from the bottom side of the metal plate 10 within a suitable die.

A support carrier 16 for our evaluation circuit 17 is attached to the metal plate 10 in surface-to-surface engagement by a suitable adhesive, the metal plate 10 being formed with additional locating projections 15' to provide for proper positioning of the evaluation circuit support carrier 16. Evaluation circuit 17 can be a standard integrated circuit of suitable amplifier construction to receive the signals from the deceleration sensor 12. The evaluation circuit 17 itself is formed by an integrated circuit. Five connecting terminals 18 are carried through the metal plate 12, being insulated therefrom, by a standard insulating connecting pin arrangement. All the connecting pins, for example, are commonly embedded in an insulator 19, which is secured as a single element in the metal plate 10. The connecting pins 18, of course, can be individually passed through the metal plate 10 in insulated relation. Preferably, the insulated pins 18 are part of a standard electronic plug-and-socket connection.

The electrical connection of the evaluation circuit carrier 16 with the deceleration sensor 12 is provided by the metal plate 10, which forms the common ground or chassis or reference terminal. Connection to the pins 18 as well as to the acceleration sensor is by bonding wires, by well-known bond wire connection technology.

In manufacture, the respective elements are secured to the metal plate 10, as noted by adhesion, soldering, and the like; then, the interconnections are made by connecting the bonding wires. A hat-shaped cover or cap 20 is then placed over the entire assembly, the interior is sealed, and the cover 20 is secured to the metal plate 10, for example by soldering, welding or other bonding or adhesion steps. The acceleration sensor as well as the evaluation circuit are thus combined into a single housing, totally sealed together, and shielded from external influences and noise signals. The top cover 20 likewise is of metal or of a metallized material, so that the deceleration sensor and evaluation circuit are all retained within a totally shielded enclosure.

Figure 2:
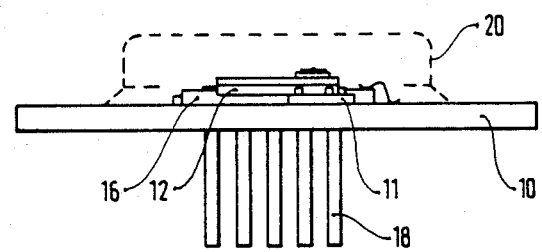
FIG. 2 is a side view of the embodiment of FIG. 1, with a housing cover shown in broken lines.

The metal plate 10 then can be secured in a suitable location, suitably oriented on a motor vehicle, for example by passing attachment screws or rivets through attachment holes 21, 22 (FIG. 1). FIG. 2 shows the top cover 20 in broken lines, so that the internal parts on plate 10 can be seen.

The deceleration sensor 12 can be attached to the metal plate in various ways. For example, and referring to FIG. 3: A U-shaped base 30, of insulating material, preferably ceramic, is secured to the metal plate 10. It is attached to the metal plate by an adhesive or by a ceramic-to-metal bond, such as a solder or molten bond. The base 30 secures the piezo-electric strip 12 between the legs of the U. For electrical connection to the two sides of the deceleration sensor strip 12, socket 30 is formed with two bores 31, 32, each, extending respectively to the upper and lower surfaces of the ceramic base 30. The deceleration sensing element 12 is then embedded in solder or a conductive plastic adhesive which extends also through the bores 31, 32; the electrically conductive fill within the bores 32 then effects electrical connection to the base plate 10; the conductive fill within the bores 31 effects electrical connection to the bonding plate 14. The bond plate 14 and/or the bottom plate 10 may be formed with projecting prongs extending into the openings 31, 32, respectively, to improve the reliability of electrical connection through the fill within the openings 31, 32.

Figure 3:
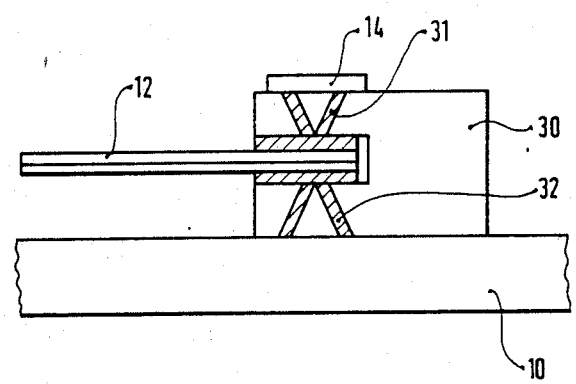
FIG. 3 is a schematic side view of another embodiemnt showing holding of a deceleration sensor.

The base for the deceleration sensor 12 can be in accordance with any other well-known construction; for example, an L-shaped base can be provided in which a solder and/or bonding plate 14 is directly attached to the top surface of the piezoelectric sensing element 12, the bottom thereof being connected similarly to the U-shaped construction shown in FIG. 3.

Figure 4:
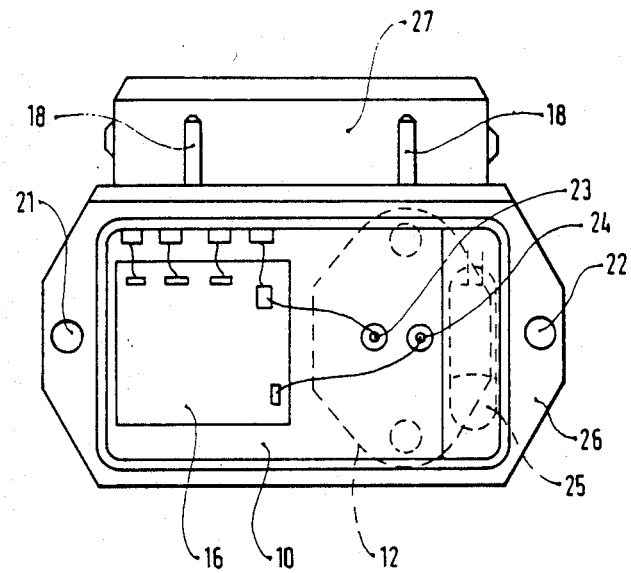
FIG. 4 is a top view of another embodiment of the invention, with the housing cover removed.
Figure 5:
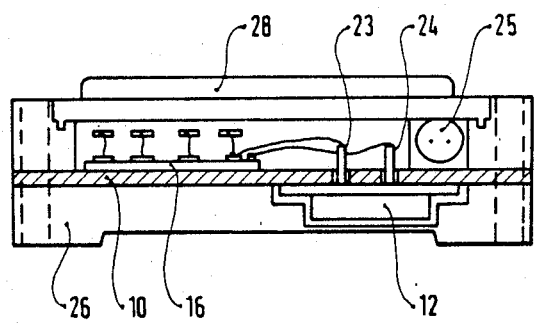
FIG. 5 is a side view, partly in section, of the embodiment of FIG. 4.

Embodiment of FIGS. 4 and 5: The evaluation circuit 16 and the deceleration sensor 12' are again secured to the metal plate 10 but, in contrast to the embodiments of FIGS. 1-3, on respectively opposite sides. The deceleration sensor 12' is encapsulated in its own housing, which includes two connecting pins 23, 24 which extend through bores in the metal plate 10 to the top side thereof—on which the evaluation circuit is located. A second deceleration sensor 24 which, for example, may be a mercury switch, is included on the top side of the metal plate 10. It can be used, as disclosed in the referenced literature, to test the function of the deceleration sensor 12'. Metal plate 10 and the elements secured thereto are then included within a plastic housing 26 which, for example, may be constructed as a two-part element which is secured around the metal plate 10 by an adhesive, or plastic-welded thereof. The housing 26 is formed on one side with a hollw recess 27 which, simultaneously, forms a receiving pocket for plug connections for the connecting pins 18, of which only two are shown in FIG. 4.

The manufacturing sequence is to first pre-assemble all the elements on the metal plate, then place the metal plate within the plastic housing, with the top cover removed. This can be done effectively automatically. Connection of the bonding wires to the respective connecting pins, as well as internally, is then carried out, and thereafter a cover 28 is placed over the plastic housing for airtight closing thereof. The plastic housing can be open at the bottom, since the deceleration sensor 12' is retained within its own airtight casing, secured to the metal plate 10. The plastic housing is extended at the bottom of the metal plate 10 to provide for mechanical protection of the deceleration sensor 12'.

The airtight housing prevents any spurious creep or sneak current paths, and thus attenuation of the very weak signals, which might, otherwise, occur for example by air humidity, formation of vapor condensation, and the like. In accordance with a preferred feature of the invention, the housing is filled with a highly viscous medium, for example oil. This oil filling can be used, both for insulation as well as for damping of the deceleration sensor. Various types of deceleration sensors may be used, and oil filling is particularly desirable if the deceleration sensor is not a piezo-electric element, but rather a bending-mass or bending-spring element which, preferably, should be damped.

Various changes and modifications may be made, and various filling substances may be used, for example entirely or only partly filling the internal housing. The internal housing may be formed with a subdivision, for example for potting one portion thereof, and filling the remainder with oil, to form a damping fluid.

In the embodiment of FIGS. 4 and 5, the housing portion surrounding the deceleration sensor 12', thus, preferably is a metal housing sealed to the metal plate 10 to provide for shielding of the deceleration sensor and to airtightly surround the deceleration sensor. The evaluation circuit which, preferably, is an amplifier, is adequately shielded by its integrated circuit structure and tight association with the metal plate 10 so that the surrounding airtight housing portion can then be made of plastic.

What is claimed:
1. In a vehicular passenger restraint system
a trigger system comprising
a deceleration sensing means including a base structure (11, 30) and a deceleration sensing element (12, 12') secured to the base structure and
an evaluation circuit structure (16, 17) including a support carrier (16) and an integrated circuit (17) on the support carrier;
and housing means retaining the deceleraton sensing means and the evaluation circuit structure, including a metal plate (10) forming a single support plate, and a hat-shaped or pot-shaped housing cap (20), the metal plate forming a closure plate for the housing cap and defining a single sealed chamber between the housing cap and the metal plate;
wherein the base structure (11, 30) of the deceleration sensing means is secured to the single metal support plate (10) at a first side of the metal plate;
a bonding plate (14) is provided electrically connected with a terminal of the deceleration sensing means and providing an electrical terminal connection therefor;
and wherein
the support carrier (16) with the integrated circuit (17) thereon lies directly against said first side of the metal support plate and is secured thereto;
wherein the single metal support plate and the housing cap are secured and selaed together to form a sealed air-tight structure defining said chamber therein, within which deceleration sensing means and the evaluation circuit are located ; and
a high viscosity damping material is provided retained in the chamber.
2. System according to claim 1, further including connecting pins (18) carried through the metal plate in insulated manner.
3. System according to claim 2 further including a strip of insulating material (19) fitted into the metal plate, the connecting pins (18) being passed through the strip of insulating material.
4. System according to claim 1, wherein the base structure (11) is a metal base, said metal base forming a second electrical terminal.
5. System according to claim 4, wherein the base structure (11) for the deceleration sensing element comprises a platform punched in the single metal plate (10), said platform forming a surface of the plate (10) projecting inwardly into the housing.
6. System according to claim 1, wherein the base structure (30) for the deceleration sensing element (12) comprises insulating material.
7. System according to claim 1 wherein the base structure for the deceleration sensing element comprises a ceramic element.
8. System according to claim 1, wherein the bonding plate (14) is secured to the deceleration sensing element (12).
9. System according to claim 1, wherein the base structure (3) comprises a U-shaped structure of insulating material, and
the deceleration sensing element (12) comprises a projecting strip retained within the legs of the U-shaped structure.
10. System according to claim 9, wherein the bonding plate (14) is secured to an upper portion of the insulating base structure (30).
11. System according to claim 9, further including externally accessible connecting pins (18) secured to the metal plate (10) and forming plug connection elements for combination with a standard plug-socket connection.
12. System according to claim 9, wherein the deceleration sensing element comprises a projecting strip (11) located in said single sealed chamber and extending in a direction essentially parallel to the single support plate;
and wherein the support carrier (16) of the evaluation circuit structure comprises a plate element in surface-to-surface engagement with said single support plate (10).
13. In a vehicular passenger restraint system,
a trigger system comprising
a deceleration sensing means (12, 12') including a base structure (11,30) and a deceleration sensing element (12, 12') secured to the base structure;
an evaluation circuit structure (16, 17) including a support carrier (16) and an integrated circuit (17) on the support carrier;
and housing means retaining the deceleration sensing means and the evaluation circuit structure, including
a metal plate (10) forming a single support plate and a hat-shaped or pot-shaped housing cap (20), the metal plate forming a closure plate for the housing cap;

wherein the base structure (11,30) of the deceleration sensing means is secured to the single metal support (10) at a first side of the metal plate;

a bonding plate (14) is provided electrically connected with a terminal of the deceleration sensing element and providing an electrical terminal connection therefor;

and wherein the support carrier (16) of the evaluation circuit structure with the integrated circuit (17) thereon lies directly against said first side of the metal support plate and is secured thereto;

the metal plate (10) and the base structure (11,30) are formed with engaging projection-and-abutment surfaces comprising bumps (15) extending inwardly of the hat-shaped or pot-shaped housing cap (20) to provide for positive positioning of the deceleration sensing element on the metal plate;

the single metal support plate and the housing cap are secured and sealed together to form an air-tight structure, the deceleration sensing means and the evaluation circuit being located inside said air-tight structure.

14. System according to claim 13 further including connecting pins (18) carried through the metal plate in insulated manner.

15. System according to claim 14, further including a strip of insulating material (19) fitted into the metal plate, the connecting pins (18) being passed through the strip of insulating material.

16. System according to claim 13, wherein the base structure (11) is a metal base, said metal base forming a second electrical terminal.

17. System according to claim 16, wherein the base structure (11) for the deceleration sensing element comprises a platform punched in the single metal plate (10), said platform forming a surface of the plate (10) projecting inwardly into the housing.

18. System according to claim 13, wherein the base structure (30) comprises a U-shaped structure of insulating material, and the deceleration sensing element (12) comprises a projecting strip retained within the legs of the U-shaped structure.

19. In a vehicular passenger restraint system a trigger system comprising a deceleration sensing means including a base structure (11, 30) and a deceleration sensing element (12, 12') secured to the base structure and an evaluation circuit structure (16,17) including a support carrier (16) and an integrated circuit (17) on the support carrier;

and housing means retaining the deceleration sensing means and the evaluation circuit structure, including a metal plate (10) forming a single support plate, and a hat-shaped or pot-shaped housing cap (20), the metal plate forming a closure plate for the housing cap and defining a single sealed chamber between the housing cap and the metal plate;

wherein the base structure (11,30) of the deceleration sensing means is secured to the single metal support plate (10) at a first side of the metal plate;

a bonding plate (14) is provided electrically connected with a terminal of the deceleration sensing means and providing an electrical terminal connection therefor;

and wherein the support carrier (16) with the integrated circuit (17) thereon lies directly against said first side of the metal support plate and is secured thereto;

wherein the single metal support plate and the housing cap are secured and sealed together to form a sealed air-tight structure defining said chamber therein; within which deceleration sensing means and the evaluation circuit are located; and a high viscosity insulating material is provided, and retained in the chamber.

20. System according to claim 19, further including connecting pins (18) carried through the metal plate in insulated manner.

21. System according to claim 20, further including a strip of insulating material (19) fitted into the metal plate, the connecting pins (18) being passed through the strip of insulating material.

22. System according to claim 19, wherein the base structure (11) is a metal base, said metal base forming a second electrical terminal.

23. System according to claim 22, wherein the base structure (11) for the deceleration sensing element comprises a platform punched in the single metal plate (10), said platform forming a surface of the plate (10) projecting inwardly into the housing.

24. System according to claim 19, wherein the base structure (30) for the deceleration sensing element (12) comprises insulating material.

25. System according to claim 19, wherein the base structure for the deceleration sensing element comprises a ceramic element.

26. System according to claim 19, wherein the bonding plate (14) is secured to the deceleration sensing element (12).

27. System according to claim 19, wherein the base structure (30) comprises a U-shaped structure of insulating material, and the deceleration sensing element (12) comprises a projecting strip retained within the legs of the U-shaped structure.

28. System according to claim 27, wherein the bonding plate (14) is secured to an upper portion of the insulating base structure (30).

29. System according to claim 19, further including externally accessible connecting pins (18) secured to the metal plate (10) and forming plug connection elements for combination with a standard plug-socket connection.

30. System according to claim 19, wherein the deceleration sensing element comprises a projecting strip (11) located in said single sealed chamber and extending in a direction essentially parallel to the single support plate;

and wherein the support carrier (16) of the evaluation circuit structure comprises a plate element in surface-to-surface engagement with said single support plate (10).

31. In a vehicular passenger restraint system a trigger system comprising a deceleration sensing means including a base structure (11, 30) and a deceleration sensing element (12, 12') secured to the base structure and an evaluation circuit structure (16, 17) including a support carrier (16) and an integrated circuit (17) on the support carrier;

and housing means retaining the deceleration sensing means and the evaluation circuit structure, including a metal plate (10) forming a single support plate, and a hat-shaped or pot-shaped housing cap (20), the metal plate forming a closure plate for the housing cap and defining a single sealed chamber between the housing cap and the metal plate;

wherein the base structure (11, 30) of the deceleration sensing means is secured to the single metal support plate (10) at a first side of the metal plate;

the deceleration sensing element comprises a projecting strip (12, 12') extending in a direction essentially parallel to the single support plate;

a bonding plate (14) is provided electrically connected with a terminal of the deceleration sensing means and providing an electrical terminal connection therefor;

and wherein the support carrier (16) with the integrated circuit (17) thereon lies directly against said first side of the single metal support plate (10)) in surface-to-surface engagement with said single metal support plate and is secured thereto; and wherein the single metal support plate and the housing cap are secured and sealed together to form a sealed air-tight structure defining said chamber therein, within which deceleration sensing means and the evaluation circuit are located.

* * * * *